United States Patent
Feldkeller et al.

(10) Patent No.: US 12,435,933 B2
(45) Date of Patent: Oct. 7, 2025

(54) HEAT EXCHANGER MODULE

(71) Applicant: MAHLE International GmbH, Stuttgart (DE)

(72) Inventors: Timo Feldkeller, Asperg (DE); Andreas Draenkow, Heimsheim (DE)

(73) Assignee: Mahle International GmbH, Stuttgart (DE)

( * ) Notice: Subject to any disclaimer, the term of this patent is extended or adjusted under 35 U.S.C. 154(b) by 258 days.

(21) Appl. No.: 18/104,830

(22) Filed: Feb. 2, 2023

(65) Prior Publication Data
US 2023/0251047 A1     Aug. 10, 2023

(30) Foreign Application Priority Data
Feb. 4, 2022   (DE) .................. 10 2022 201 204.6

(51) Int. Cl.
| | |
|---|---|
| F28F 9/02 | (2006.01) |
| F25B 40/02 | (2006.01) |
| F25B 40/04 | (2006.01) |
| F25B 41/31 | (2021.01) |
| F28F 3/08 | (2006.01) |
| B60H 1/00 | (2006.01) |
| B60H 1/32 | (2006.01) |
| F28D 9/00 | (2006.01) |
| F28D 21/00 | (2006.01) |

(52) U.S. Cl.
CPC ............ *F28F 9/0251* (2013.01); *F25B 40/02* (2013.01); *F25B 40/04* (2013.01); *F25B 41/31* (2021.01); *F28F 3/086* (2013.01); *B60H 1/00342* (2013.01); *B60H 1/32284* (2019.05); *B60H 1/3233* (2013.01); *F25B 2339/044* (2013.01); *F25B 2339/047* (2013.01); *F25B 2400/21* (2013.01); *F28D 9/0093* (2013.01); *F28D 2021/0084* (2013.01)

(58) Field of Classification Search
CPC ......... F28F 9/0251; F28F 3/086; F25B 41/31; F25B 40/02; F25B 40/04; F25B 2400/21; F25B 2339/044; F25B 2339/047; F28D 2021/0084; F28D 9/0093; B60H 1/00342; B60H 1/32284; B60H 1/3233
USPC ......................................................... 165/78
See application file for complete search history.

(56) References Cited

U.S. PATENT DOCUMENTS

| | | | |
|---|---|---|---|
| 10,427,500 B2 | 10/2019 | Kim et al. | |
| 10,717,338 B2 | 7/2020 | Duerr et al. | |
| 2016/0375740 A1* | 12/2016 | Duerr .................. | F28F 3/08 62/506 |
| 2016/0375745 A1* | 12/2016 | Duerr .................. | F28D 9/0093 62/474 |
| 2024/0034126 A1* | 2/2024 | Rhee .................. | B60H 1/00342 |
| 2024/0166019 A1* | 5/2024 | Rhee .................. | B60H 1/323 |

FOREIGN PATENT DOCUMENTS

| | | |
|---|---|---|
| DE | 102014204935 A1 | 10/2015 |
| DE | 102017221052 A1 | 2/2019 |

* cited by examiner

*Primary Examiner* — Joel M Attey
(74) *Attorney, Agent, or Firm* — Muncy, Geissler, Olds & Lowe, P.C.

(57) ABSTRACT

A heat exchanger module with a first block of a first heat exchanger, further with a second block of a second heat exchanger, and further with an expansion valve, wherein the first block, the second block and the expansion valve are designed as an interconnected module.

10 Claims, 4 Drawing Sheets

HEAT EXCHANGER MODULE

This nonprovisional application claims priority under 35 U.S.C. § 119(a) to German Patent Application No. 10 2022 201 204.6, which was filed in Germany on Feb. 4, 2022, and which is herein incorporated by reference.

BACKGROUND OF THE INVENTION

Field of the Invention

The present invention relates to a heat exchanger module, in particular for a refrigerant circuit, in particular a motor vehicle.

Description of the Background Art

In motor vehicles, refrigerant circuits are known in which a liquid-cooled condenser is interconnected as the first heat exchanger in the refrigerant circuit in order to cool and condense the refrigerant compressed in the compressor of the refrigerant circuit in heat transfer with a first liquid coolant, such as water. Also, a second heat exchanger in the refrigerant circuit is known, which, as a so-called chiller, is flowed through by refrigerant, and a second liquid coolant, wherein the second liquid coolant serves, for example, to cool a power unit, such as a vehicle battery or the like. The second coolant is cooled in the chiller with the refrigerant in heat transfer, wherein the refrigerant expanded by means of an expansion valve typically evaporates.

Such heat exchangers require a relatively large amount of installation space and a high number of pipes or lines to connect these heat exchangers and supply them with the refrigerant and dissipate the refrigerant and to supply them with the respective liquid coolant or to dissipate the respective liquid coolant. The required pipes or lines also require appropriate installation space, wherein the costs in relation to provision and assembly of the pipes or lines represent a considerable and undesirable cost factor. This also results in a considerable number of interfaces that can represent potential sources of error.

SUMMARY OF THE INVENTION

It is therefore an object of the present invention to provide a heat exchanger module which reduces the problems of the prior art.

In an exemplary embodiment of the invention, a heat exchanger module is provided having a first block of a first heat exchanger, which is formed as a liquid-cooled condenser, wherein the first block has first fluid channels for refrigerants and second fluid channels for a first liquid coolant, further with a second block of a second heat exchanger, which is formed as a liquid-cooled chiller, wherein the second block has third fluid channels for refrigerant and fourth fluid channels for a second liquid coolant, and further having an expansion valve, wherein the first block, the second block and the expansion valve are formed as an interconnected module, wherein the first block has a first refrigerant inlet and a first refrigerant outlet and the second block has a second refrigerant inlet, a first refrigerant passage channel, a second refrigerant outlet and a third refrigerant inlet and a third refrigerant outlet, wherein the expansion valve comprises a fourth refrigerant inlet and a fourth refrigerant outlet, such that the first refrigerant outlet of the first block is in fluid connection with the second refrigerant inlet of the second block, the second refrigerant inlet of the second block is in fluid connection via the first refrigerant passage channel with the second refrigerant outlet of the second block, the second refrigerant outlet of the second block is in fluid connection with the fourth refrigerant inlet of the expansion valve and the fourth refrigerant outlet of the expansion valve is in fluid connection with the third refrigerant inlet of the second block. Thus, a direct connection of the first block, second block and expansion valve regarding the refrigerant is achieved, so that no additional pipes or lines are required in this respect to distribute or pass on the refrigerant. The first liquid coolant and/or the second liquid coolant are supplied accordingly to corresponding coolant inlets and discharged at corresponding coolant outlets. In this case, the first liquid coolant may be materially equal to the second liquid coolant, wherein the temperatures of the two liquid coolants may certainly be different. Thus, the two liquid coolants can originate from one coolant circuit, but they can have different temperatures. Also, the two liquid coolants can originate from different coolant circuits, and they can also be materially different.

The first block can be formed such that refrigerant is flowable via the first refrigerant inlet into the first block, the first fluid channels of the first block are flowable by the refrigerant and the refrigerant is flowable through the first refrigerant outlet from the first block. Accordingly, the first refrigerant inlet together with the first fluid channels forms a fluid path for the refrigerant to the first refrigerant outlet. In this case, the first fluid channels may be formed by a plurality of fluid channels, which are flowable in parallel and/or serially in at least one group or in groups, depending on need, in different flows. Due to the condensation of refrigerant, the flow cross-section of the fluid channels can decrease, at least in part, from flow to flow, for example.

The first block can have a desuperheating and condensing section and a subcooling section, wherein optionally between the desuperheating and condensing section and the subcooling section, a refrigerant collector is arranged interconnected. The desuperheating and condensing section is used for desuperheating and condensation of the flowing refrigerant in heat exchange with the first liquid coolant and the subcooling section is used for subcooling the refrigerant in heat exchange with the first liquid coolant. The refrigerant collector may be formed as a reservoir, such as a volume, pipe collector, a bottle, etc., integrated into the first block or be arranged adjacent to the first block, wherein it is then fluidly connected to the first block and can be flowed through by the refrigerant. The refrigerant collector is preferably used for stockpiling the refrigerant for volume compensation but also for phase separation of vaporous refrigerant and liquid refrigerant upstream of the subcooling section and also, if applicable, for filtering and dewatering the refrigerant with an optional filter and/or dryer.

The first block can comprise a second refrigerant passage channel and a third refrigerant passage channel, wherein the second refrigerant passage channel fluidly connects the desuperheating and condensing section with the refrigerant collector and the third refrigerant passage channel fluidly connects the refrigerant collector with the subcooling section. Thus, the end portion of the desuperheating and condensing section can be connected via the second refrigerant passage channel to the inlet of the refrigerant collector and the outlet of the refrigerant collector can be connected to the initial portion of the subcooling section via the third refrigerant passage channel. This achieves an uncomplicated internal fluid connection without complex additional pipes or lines.

The second block can be formed such that refrigerant is flowable via the second refrigerant inlet of the second block into the second block, the second block is traversable by the refrigerant through the first refrigerant passage channel and the refrigerant is flowable via the second refrigerant outlet to the expansion valve with the fourth refrigerant inlet, wherein the expansion valve is flowable by the refrigerant and the refrigerant is flowable from the fourth refrigerant outlet of the expansion valve into the third refrigerant inlet of the second block, the third fluid channels of the second block are flowable from the third refrigerant inlet, wherein at the third refrigerant outlet the refrigerant is flowable from the second block. This also achieves a compact design without additional pipes or lines.

Between the first block and the second block a third block of a third heat exchanger, which is designed in particular as an internal heat exchanger, can be interconnected, wherein the third block has fifth fluid channels for refrigerants and sixth fluid channels for refrigerants. Thus, heat transfer can be conducted between the refrigerant leaving the first block and the refrigerant leaving the second block, which causes pre-cooling of the refrigerant before it flows into the second block, which improves the cooling performance of the second block and thus improves the cooling of the second liquid coolant. This can be done in particular by integrating the third block between the first block and the second block, which reduces the installation space required and does not require any additional pipes or lines for interconnection.

The third block can have a fifth refrigerant inlet and a fifth refrigerant outlet which communicate with the fifth fluid channels, and that the third block has a sixth refrigerant inlet and a sixth refrigerant outlet which communicate with the sixth fluid channels. This achieves a simple design.

The first refrigerant outlet of the first block can be in fluid connection via the fifth refrigerant inlet, the fifth fluid channels and the fifth refrigerant outlet with the second refrigerant inlet of the second block, wherein the second block is connected such that at the third refrigerant outlet the refrigerant is flowable from the second block, and via the sixth refrigerant inlet, the sixth fluid channels and the sixth refrigerant outlet can be flowed out of the third block. This achieves a simple and space-saving design.

The first block, the second block and/or the third block can be formed in stacked-plate design, i.e., formed with a respective stacking of stacking plates, wherein openings for the inflow and outflow of refrigerant and/or liquid coolant are provided in the stacking plates, and that between adjacent stacking plates, first fluid channels, second fluid channels, third fluid channels, fourth fluid channels, fifth fluid channels and/or sixth fluid channels are formed. The design of the stacking plates, in stacking them on top of each other, creates a compact heat exchanger and a compact heat exchanger module.

The first refrigerant passage channel, the second refrigerant passage channel, the third refrigerant passage channel, the fourth refrigerant passage channel and/or the fifth refrigerant passage channel can be formed by stacking plates, wherein the stacking plates form openings as well as the annular regions and/or annular formations surrounding the openings, wherein the annular formations and/or the annular regions of adjacent stacking plates are sealed together to form a sealed channel as the respective refrigerant passage channel. This can help ensure that without the use of at least one additionally inserted pipe, such as an immersion pipe, a sealed channel can be created as a refrigerant passage channel through the respective block, which can take over the function of an immersion pipe, but this channel can be self-created with the stacking plates. This reduces manufacturing effort and costs.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The invention relates to a heat exchanger module 1, 101, 201, in particular for a motor vehicle.

Figure 1:
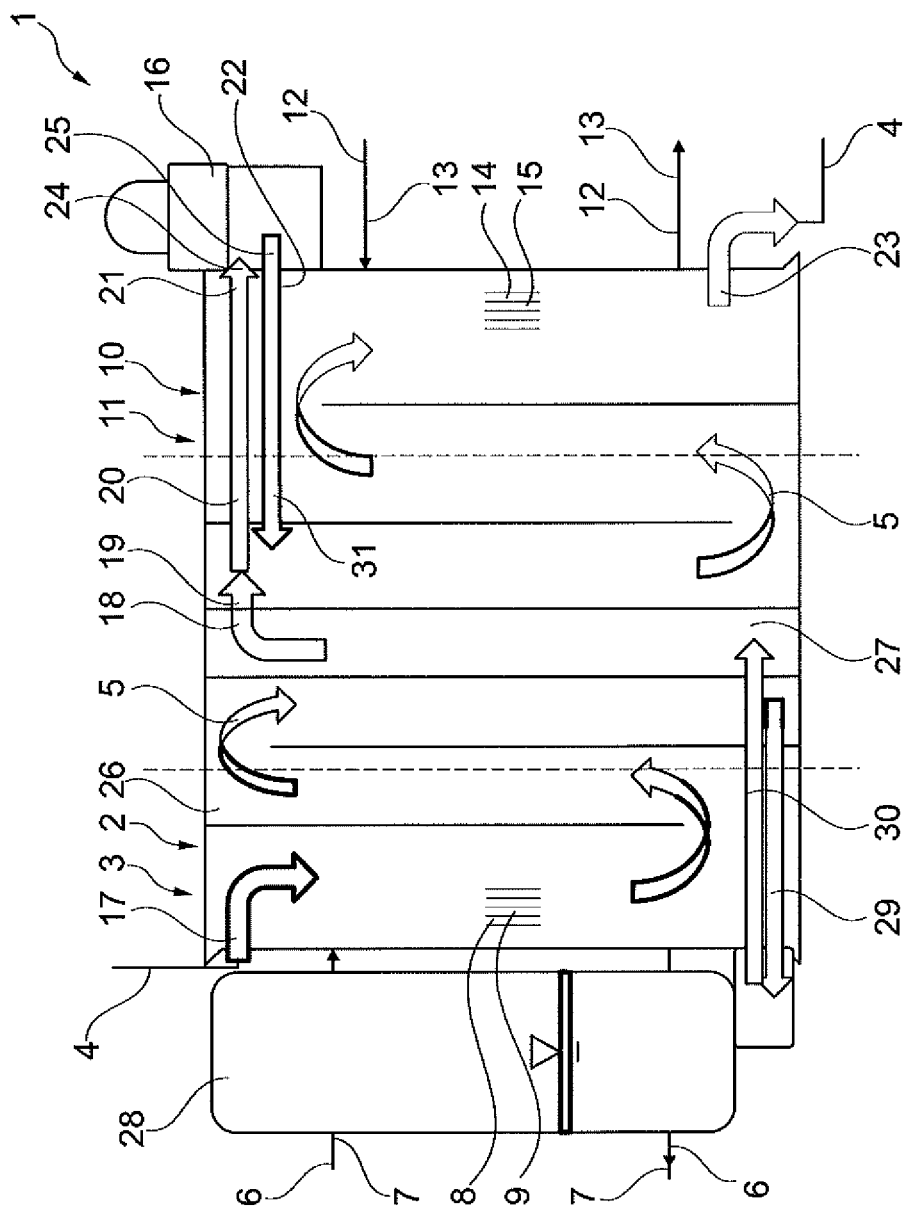
FIG. 1 is a schematic representation of an example of a heat exchanger module according to the invention.
Figure 2:
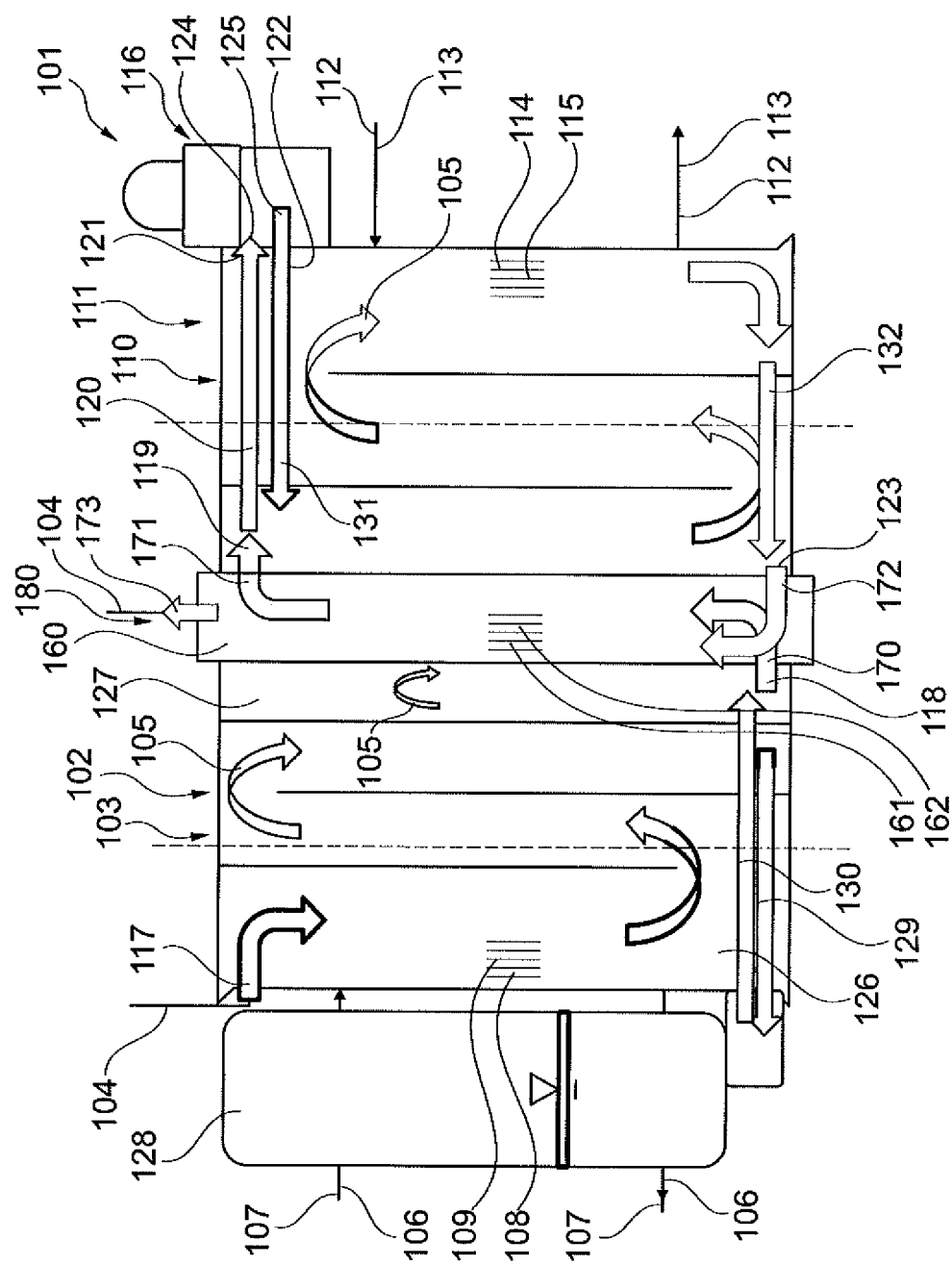
FIG. 2 is a schematic representation of an example of a heat exchanger module according to the invention.
Figure 3:
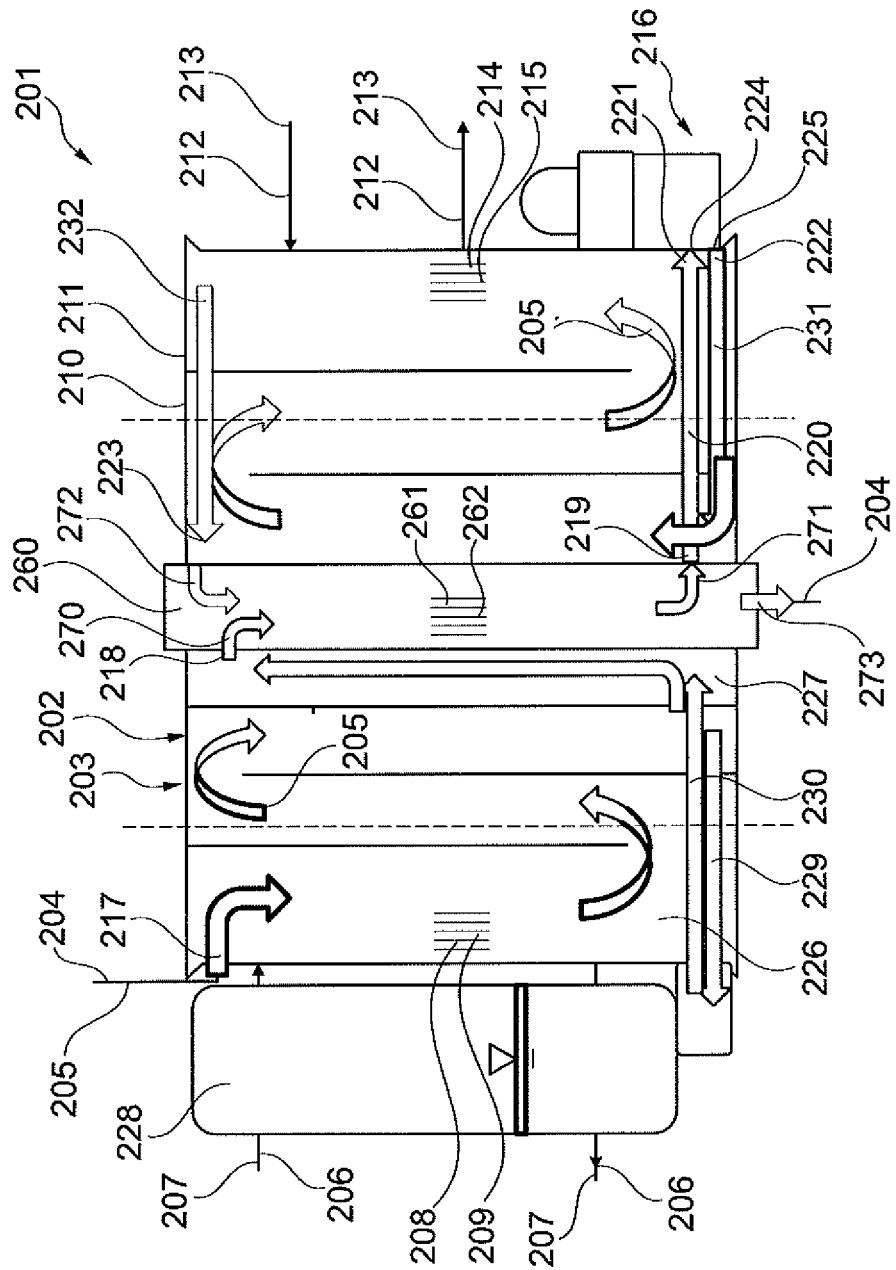
FIG. 3 is a schematic representation of an example of a heat exchanger module according to the invention.
Figure 4:
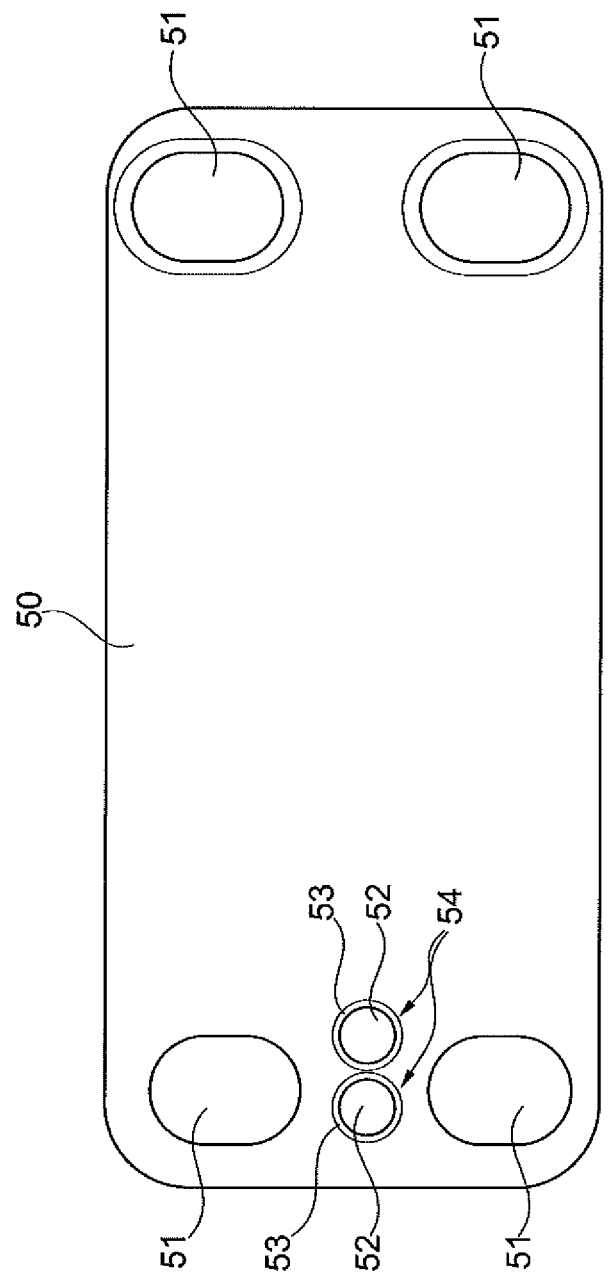
FIG. 4 is a schematic view of a stacking plate of a heat exchanger module according to the invention.

In a schematic representation, FIGS. 1 to 3 each show a respective embodiment of a heat exchanger module according to the invention 1, 101, 201. FIG. 4 shows schematically the view of a stacking plate for the formation of a heat exchanger of such a heat exchanger module 1, 101, 201.

In this case, the heat exchanger module 1 according to FIG. 1 has a first block 2, which forms a first heat exchanger 3, which is designed as a liquid-cooled condenser. The first heat exchanger 3 is interconnected in a refrigerant circuit 4, so that it is flowable by a refrigerant 5.

Furthermore, the first heat exchanger 3 is interconnected in a circuit 6 of a first liquid coolant 7, so that the first liquid coolant 7 is flowable through the first heat exchanger 3 and is thereby in heat transfer with the refrigerant 5. As a result, the refrigerant 5 is cooled in the first heat exchanger 3 formed as a condenser, condensed, and optionally also subcooled. The first liquid coolant 7 is heated in the process.

In this case, the first heat exchanger 3 is formed as the first block 2 of the heat exchanger module 1. The first block 2 has first fluid channels 8 for refrigerant 5 and second fluid channels 9 for the first liquid coolant 7. In this case, the fluid channels 8, 9 may, for example, alternate or be arranged in a different order or stacking.

In this case, the heat exchanger module 1 also has a second block 10, which forms a second heat exchanger 11, which is designed as a liquid-cooled chiller. The second heat exchanger 11 is interconnected in the refrigerant circuit 4, so that it is flowable by the refrigerant 5.

Furthermore, the second heat exchanger 11 is interconnected in a circuit 12 of a second liquid coolant 13, so that the second liquid coolant 13 is flowable through the second heat exchanger 11 and is thereby in heat transfer with the refrigerant 5. As a result, the refrigerant 5 is evaporated in the second heat exchanger 11 designed as a chiller. The second liquid coolant 13 is cooled in the process.

In this case, the second heat exchanger 11 is formed as the second block 10 of the heat exchanger module 1. For this purpose, the second block 10 has three fluid channels 14 for refrigerant 5 and fourth fluid channels 15 for the second liquid coolant 13. In this case, the fluid channels 14, 15 may, for example, alternate or be arranged in a different order or stacking.

Furthermore, the heat exchanger module has an expansion valve 16.

The first block 2, the second block 10 and the expansion valve 16 are designed as an interconnected module. This means that both blocks 2 and 10, for example, are connected to each other, e.g., soldered, screwed, welded, or glued or connected in an otherwise form-fitting or material-fitting manner. The expansion valve 16 is attached to the second block 10, for example soldered, screwed, welded, or glued or otherwise form-fittingly or material-fittingly connected.

The first block 2, i.e., the first heat exchanger 3, has a first refrigerant inlet 17 and a first refrigerant outlet 18.

The second block 10 has a second refrigerant inlet 19, a first refrigerant passage channel 20, a second refrigerant outlet 21 and a third refrigerant inlet 22 and a third refrigerant outlet 23.

The expansion valve 16 has a fourth refrigerant inlet 24 and a fourth refrigerant outlet 25.

The interconnection of the blocks 2, 10 and the expansion valve 16 is thereby as follows:

The first refrigerant outlet 18 of the first block 2 is in fluid connection with the second refrigerant inlet 19 of the second block 10. This fluid connection can be direct or indirect. In the embodiment of FIG. 1 shown, this fluid connection is direct and immediate.

In the first embodiment of FIG. 1, the first block 2 is formed such that refrigerant 5 can flow into the first block 2 via the first refrigerant inlet 17, then the first fluid channels 8 of the first block 2 are flowed through by the refrigerant 5 and the refrigerant 5 can flow out through the first refrigerant outlet 18 from the first block 2.

In its function as a condenser, the first heat exchanger 3 of the first block 2, and thus also the first block 2, has a desuperheating and condensing section 26 and a subcooling section 27. In the desuperheating and condensing section 26, the refrigerant 5 is desuperheated, i.e., cooled, from its temperature at the entry into the first block 2 to condensation temperature. In the subcooling section 27, the condensed refrigerant 5 is further cooled from its condensation temperature, i.e., subcooled.

FIG. 1 illustrates that optionally, a refrigerant collector 28 is arranged interconnected between the desuperheating and condensing section 26 and the subcooling section 27.

For interconnecting the refrigerant collector 28, the first block 2 comprises a second refrigerant passage channel 29 and a third refrigerant passage channel 30. In this case, the second refrigerant passage channel 29 fluidly connects the desuperheating and condensing section 26 with the refrigerant collector 28, and the third refrigerant passage channel 30 fluidly connects the refrigerant collector 28 with the subcooling section 27. The refrigerant 5 therefore flows at the end of the desuperheating and condensing section 26 through the second refrigerant passage channel 29, through the refrigerant collector 28 and then through the third refrigerant passage channel 30 to the subcooling section 27.

The second refrigerant inlet 19 of the second block 10 is in fluid connection via the first refrigerant passage channel 20 with the second refrigerant outlet 21 of the second block 10. The second refrigerant outlet 21 of the second block 10 is in fluid connection with the fourth refrigerant inlet 24 of the expansion valve 16, and the fourth refrigerant outlet 25 of the expansion valve 16 is in fluid connection with the third refrigerant inlet 22 of the second block 10. Thus, the expansion valve 16 is interconnected with the second block 10.

The second block 10 is designed such that the refrigerant 5 flows into the second block 10 via the second refrigerant inlet 19 of the second block 10, the second block 10 is traversable by the refrigerant 5 through the first refrigerant passage channel 20 and the refrigerant 5 flows out via the second refrigerant outlet 21, to the expansion valve 16 with the fourth refrigerant inlet 24, wherein the expansion valve 16 is flowed through by the refrigerant 5 and the refrigerant 5 flows out into the third refrigerant inlet 22 of the second block 10 from the fourth refrigerant outlet 25 of the expansion valve 16. The third fluid channels 14 of the second block 10 are flowed through from the third refrigerant inlet 22, wherein at the third refrigerant outlet 23, the refrigerant 5 flows out from the second block 10.

In this case, according to the shown example of FIG. 1, optionally a fourth refrigerant passage channel 31 may be provided between the third refrigerant inlet 22 and the third fluid channels 14 of the second block 10.

Optionally, which, however, is not shown in the embodiment of FIG. 1, a fifth refrigerant passage channel may be provided between the third fluid channels 14 of the second block 10 and the third refrigerant outlet 23.

According to an advantageous idea, the first block 2 and/or the second block 10 and/or additional blocks, such as an optional third block, may be formed in a stacked-plate design with a stacking of stacking plates 50, see FIG. 4, wherein in the stacking plates 50 openings 51 for the inflow and outflow of refrigerant 5 and/or liquid coolant are provided and that between adjacent stacking plates 50, first fluid channels 8, second fluid channels 9, third fluid channels 14 and/or fourth fluid channels 15 and optionally fifth fluid channels and/or sixth fluid channels are formed.

In this case, the stacking plates 50 also serve to ensure that the first refrigerant passage channel 20, the second refrigerant passage channel 29, the third refrigerant passage channel 30 and/or the fourth refrigerant passage channel 31 and/or additional refrigerant passage channels, such as a fifth refrigerant passage channel, is/are formed, wherein the stacking plates 50 form openings 52 and annular regions 53 and/or annular formations 54 surrounding the openings 52, wherein the annular formations 54 and/or the annular regions 53 of adjacent stacking plates 50 are sealed together to form a sealed channel as a refrigerant passage channel 20, 29, 30, 31.

FIG. 2 shows a second embodiment of a heat exchanger module 101, which comprises a first block 102, which forms a first heat exchanger 103, which is designed as a liquid-cooled condenser. The first heat exchanger 103 is interconnected in a refrigerant circuit 104, so that it is flowable by a refrigerant 105.

Furthermore, the first heat exchanger 103 is interconnected in a circuit 106 of a first liquid coolant 107, so that the first liquid coolant 107 is flowable through the first heat exchanger 103 and is thereby in heat transfer with the refrigerant 105. As a result, the refrigerant 105 is desuperheated in the first heat exchanger 103 formed as a condenser, condensed and optionally also subcooled. The first liquid coolant 107 is heated in the process.

In this case, the first heat exchanger 103 is formed as the first block 102 of the heat exchanger module 101. The first block 102 has first fluid channels 108 for refrigerant 105 and second fluid channels 109 for the first liquid coolant 107. In this case, the fluid channels 108, 109 may, for example, alternate or be arranged in a different order or layering.

In this case, the heat exchanger module 101 also comprises a second block 110, which forms a second heat exchanger 111, which is designed as a liquid-cooled chiller. The second heat exchanger 111 is interconnected in the refrigerant circuit 104, so that it is flowable by the refrigerant 105.

Furthermore, the second heat exchanger 111 is interconnected in a circuit 112 of a second liquid coolant 113, so that the second liquid coolant 113 is flowable through the second heat exchanger 111 and is thereby in heat transfer with the refrigerant 105. As a result, the refrigerant 105 is evaporated in the second heat exchanger 111 designed as a chiller. The second liquid coolant 113 is cooled in the process.

In this case, the second heat exchanger 111 is formed as the second block 110 of the heat exchanger module 101. To this end, the second block 110 has third fluid channels 114 for refrigerant 105 and fourth fluid channels 115 for the second liquid coolant 113. In this case, the fluid channels 114, 115 may, for example, alternate or be arranged in a different order or layering.

Furthermore, the heat exchanger module has an expansion valve 116.

The first block 102, the second block 110 and the expansion valve 116 are designed as an interconnected module. This means that both blocks 102 and 110 are, for example, connected to each other, such as soldered, screwed, welded, or glued or otherwise form-fittingly or material-fittingly connected. The expansion valve 116 is attached to the second block 110, for example soldered, screwed, welded, or glued or otherwise form-fittingly or material-fittingly connected.

The first block 102, i.e., the first heat exchanger 103, has a first refrigerant inlet 117 and a first refrigerant outlet 118.

The second block 110 has a second refrigerant inlet 119, a first refrigerant passage channel 120, a second refrigerant outlet 121 and a third refrigerant inlet 122 and a third refrigerant outlet 123.

The expansion valve 116 has a fourth refrigerant inlet 124 and a fourth refrigerant outlet 125.

Between the first block 102 and the second block 110, a third block 160 is provided. The third block 160 has fifth fluid channels 161 for refrigerant 105 from the first block 102 and sixth fluid channels 162 for refrigerant 105 from the second block 110. In this case, the fluid channels 161, 162 may, for example, alternate or be arranged in a different order or layering.

The third block 160 has a fifth refrigerant inlet 170, a fifth refrigerant outlet 171 and a sixth refrigerant inlet 172 and a sixth refrigerant outlet 173. The fifth refrigerant inlet 170 is connected by the fifth fluid channels 161 to the fifth refrigerant outlet 171, and the sixth refrigerant inlet 172 is connected by the sixth fluid channels 162 to the sixth refrigerant outlet 173.

The interconnection of the blocks 102, 110, 160 and the expansion valve 116 is as follows: the first refrigerant outlet 118 of the first block 102 is in fluid connection with the fifth refrigerant inlet 170 of the third block 160. This fluid connection can be direct or indirect. In the embodiment of FIG. 2 shown, this fluid connection is direct and immediate. The fifth refrigerant outlet 171 is fluidly connected to the second refrigerant inlet 119.

In the second embodiment of FIG. 2, the first block 102 is formed such that the refrigerant 105 can flow into the first block 102 via the first refrigerant inlet 117, then the first fluid channels 108 of the first block 102 are flowed through by the refrigerant 105 and the refrigerant 105 can flow out through the first refrigerant outlet 118 from the first block 102.

In its function as a condenser, the first heat exchanger 103 of the first block 102 and thus also the first block 102 has a desuperheating and condensing section 126 and a subcooling section 127. In the desuperheating and condensing section 126, the refrigerant 105 is desuperheated, i.e., cooled, from its temperature at the entry into the first block 102 to condensation temperature. In the subcooling section 127, the condensed refrigerant 105 is further cooled from its condensation temperature, i.e., subcooled.

FIG. 2 illustrates that optionally between the desuperheating and condensing section 126 and the subcooling section 127, a refrigerant collector 128 is arranged interconnected.

For interconnecting the refrigerant collector 128, the first block 2 comprises a second refrigerant passage channel 129 and a third refrigerant passage channel 130. The second refrigerant passage channel 129 fluidly connects the desuperheating and condensing section 126 to the refrigerant collector 128 and the third refrigerant passage channel 130 fluidly connects the refrigerant collector 128 to the subcooling section 127. At the end of the desuperheating and condensing section 126, the refrigerant 105 therefore flows through the second refrigerant passage channel 129, through the refrigerant collector 128 and then through the third refrigerant passage channel 130 to the subcooling section 127.

The second refrigerant inlet 119 of the second block 110 is fluidly connected to the second refrigerant outlet 121 of the second block 110 via the first refrigerant passage channel 120. The second refrigerant outlet 121 of the second block 110 is in fluid connection with the fourth refrigerant inlet 124 of the expansion valve 116, and the fourth refrigerant outlet 125 of the expansion valve 116 is in fluid connection with the third refrigerant inlet 122 of the second block 110. Thus, the expansion valve 116 is interconnected with the second block 110.

The second block 110 is designed such that the refrigerant 105 flows through the second refrigerant inlet 119 of the second block 110 into the second block 110, the second block 110 is traversable by the refrigerant 105 through the first refrigerant passage channel 120 and the refrigerant 105 flows out via the second refrigerant outlet 121, to the expansion valve 116 with the fourth refrigerant inlet 124, wherein the expansion valve 116 is flowed through by the refrigerant 105 and the refrigerant 105 flows out from the fourth refrigerant outlet 125 of the expansion valve 116 into the third refrigerant inlet 122 of the second block 110. From the third refrigerant inlet 122, the third fluid channels 114 of the second block 110 are flowed through, wherein at the third refrigerant outlet 123 the refrigerant 105 flows out from the second block 110.

According to the embodiment of FIG. 2 shown, a fourth refrigerant passage channel 131 may optionally be provided between the third refrigerant inlet 122 and the third fluid channels 14 of the second block 10.

Optionally, which is also shown in the embodiment of FIG. 2, a fifth refrigerant passage channel 132 may be provided between the third fluid channels 114 of the second block 110 and the third refrigerant outlet 123.

The third refrigerant outlet 123 of the second block 110 is fluidly connected to the sixth refrigerant inlet 172 of the third block 160, wherein the fifth refrigerant inlet 170 of the third block 160 is fluidly connected to the first refrigerant outlet 118 of the first block 102. The fifth refrigerant outlet 171 of the third block 160 is fluidly connected to the second refrigerant inlet 119 of the second block 110. From the sixth refrigerant outlet 173, the refrigerant 105 is discharged from the heat exchanger module 101.

The third block 160 is designed such that the refrigerant 105 flows through the fifth refrigerant inlet 170 of the third block 160 into the third block 160, the third block 160 flows through the fifth fluid channels 161 and the refrigerant 105 flows out via the fifth refrigerant outlet 171 from the third block 160, towards the second block 110. Furthermore, refrigerant 105 is flowed from the second block 110 from the third refrigerant outlet 123 into the sixth refrigerant inlet 172 of the third block 160. The third block 160 is flowed through the sixth fluid channels 162 and the refrigerant 105 flows out from the third block 160 via the sixth refrigerant outlet 173.

According to an advantageous idea, the first block 102 and/or the second block 110 and/or additional blocks, such as an optional third block 160, may be formed in stacked-plate design with a stacking of stacking plates 50, see FIG. 4, wherein in the stacking plates 50 openings 51 for inflow and outflow of refrigerant 105 and/or liquid coolant are provided and that between adjacent stacking plates 50, first fluid channels 8, second fluid channels 109, third fluid channels 114 and/or fourth fluid channels 115 and optionally fifth fluid channels 161 and/or sixth fluid channels 162 are formed.

In this case, the stacking plates 50 also serve to ensure that the first refrigerant passage channel 120, the second refrigerant through passage channel 129, the third refrigerant passage channel 130 and/or the fourth refrigerant passage channel 131 and/or additional refrigerant passage channels, such as a fifth refrigerant passage channel 132, is or are formed, wherein the stacking plates form openings 52 and annular regions 53 and/or annular formations 54 surrounding the openings 52, wherein the annular formations 54 and/or the annular regions 53 of adjacent stacking plates 50 are sealed together to form a sealed channel as a refrigerant passage channel 120, 129, 130, 131, 132.

The difference to the embodiment of FIG. 1 is therefore that between the first block 102 and the second block 110, a third block 160 of a third heat exchanger 180, which is formed as an internal heat exchanger, is interconnected, wherein the third block 160 has fifth fluid channels 161 for refrigerant and sixth fluid channels 162 for refrigerant. However, the refrigerant 105 has different temperatures in the fluid channels 161 and 162 because it originates from different heat exchangers 103, 111.

The third block 160 has a fifth refrigerant inlet 170 and a fifth refrigerant outlet 171, which communicate with the fifth fluid channels 161, and the third block 160 has a sixth refrigerant inlet 172 and a sixth refrigerant outlet 173, which communicate with the sixth fluid channels 162.

The interconnection is such that the first refrigerant outlet 118 of the first block 102 is in fluid connection via the fifth refrigerant inlet 170, the fifth fluid channels 161 and the fifth refrigerant outlet 171 are in fluid connection with the second refrigerant inlet 119 of the second block 110, wherein the second block 110 is interconnected in such a way that at the third refrigerant outlet 123, the refrigerant 105 can be flowed out of the second block 110 and can be flowed out via the sixth refrigerant inlet 172, the sixth fluid channels 162 and the sixth refrigerant outlet 173 from the third block 160.

In the second embodiment of FIG. 2, the subcooling section 127, for example, is flowed through in two flows, resulting in a deflection of the refrigerant 105 in the subcooling section 127.

FIG. 3 shows a third embodiment of a heat exchanger module 201, which comprises a first block 202, which forms a first heat exchanger 203, which is designed as a liquid-cooled condenser. The first heat exchanger 203 is interconnected in a refrigerant circuit 204, so that it is flowable by a refrigerant 205.

Furthermore, the first heat exchanger 203 is interconnected in a circuit 206 of a first liquid coolant 207, so that the first liquid coolant 207 is flowable through the first heat exchanger 203 and is thereby in heat transfer with the refrigerant 205. As a result, the refrigerant 205 is desuperheated in the first heat exchanger 203 designed as a condenser, condensed and optionally subcooled. The first liquid coolant 207 is heated in the process.

The first heat exchanger 203 is formed as the first block 202 of the heat exchanger module 201. The first block 202 has first fluid channels 208 for refrigerant 205 and second fluid channels 209 for the first liquid coolant 207. In this case, the fluid channels 208, 209 may, for example, alternate or be arranged in a different order or layering.

In this case, the heat exchanger module 201 also has a second block 210, which forms a second heat exchanger 211, which is designed as a liquid-cooled chiller. The second heat exchanger 211 is interconnected in the refrigerant circuit 204, so that it is also flowable by the refrigerant 205.

Furthermore, the second heat exchanger 211 is interconnected in a circuit 212 of a second liquid coolant 213, so that the second liquid coolant 213 is flowable through the second heat exchanger 211 and is thereby in heat transfer with the refrigerant 205. As a result, the refrigerant 205 is evaporated in the second heat exchanger 211 designed as a chiller. The second liquid coolant 213 is cooled in the process.

The second heat exchanger 211 is designed as the second block 210 of the heat exchanger module 201. The second block 210 has third fluid channels 214 for the refrigerant 205 and fourth fluid channels 215 for the second liquid coolant 213. In this case, the fluid channels 214, 215 may, for example, alternate or be arranged in a different order or layering.

Furthermore, the heat exchanger module has an expansion valve 216.

Between the first block 202 and the second block 210, a third block 260 is provided. The third block 260 has fifth fluid channels 261 for refrigerant 205 from the first block 202, and sixth fluid channels 262 for refrigerant 205 from the second block 210. In this case, the fluid channels 261, 262 may, for example, alternate or be arranged in a different order or layering.

The first block 202, the second block 210, the third block 260 and the expansion valve 216 are designed as an interconnected module. This means that both blocks 202 and 260 and blocks 260 and 210 are each connected to one another, for example, soldered, screwed, welded, or glued or otherwise form-fittingly or material-fittingly connected. The expansion valve 216 is attached to the second block 210, for example soldered, screwed, welded, or glued or otherwise form-fittingly or material-fittingly connected.

The first module 202, i.e., the first heat exchanger 203, has a first refrigerant inlet 217 and a first refrigerant outlet 218.

The second block 210 has a second refrigerant inlet 219, a first refrigerant passage channel 220, a second refrigerant outlet 221 and a third refrigerant inlet 222 and a third refrigerant outlet 223.

The expansion valve 216 has a fourth refrigerant inlet 224 and a fourth refrigerant outlet 225.

The third block 260 has a fifth refrigerant inlet 270, a fifth refrigerant outlet 271 and a sixth refrigerant outlet 272 and a sixth refrigerant outlet 273. The fifth refrigerant inlet 270 is connected to the fifth refrigerant outlet 271 by the fifth fluid channels 261 and the sixth refrigerant inlet 272 is connected to the sixth refrigerant outlet 273 by the sixth fluid channels 262.

The interconnection of the blocks 102, 210, 260 and the expansion valve 216 is as follows:

The first refrigerant outlet 218 of the first block 202 is in fluid connection with the fifth refrigerant inlet 270 of the third block 260. The fifth refrigerant outlet 271 is fluidly connected to the second refrigerant inlet 219.

In the third embodiment of FIG. 3, the first block 202 is designed such that refrigerant 205 can flow into the first block 202 via the first refrigerant inlet 217, then the first fluid channels 208 of the first block 202 are flowed through by the refrigerant 205 and the refrigerant 205 can flow out of the first block 202 through the first refrigerant outlet 218.

In its function as a condenser, the first heat exchanger 203 of the first block 202, and thus also the first block 202, has a desuperheating and condensing section 226 and a subcooling section 227. In the desuperheating and condensing section 226, refrigerant 205 is desuperheated, i.e., cooled, from its temperature at the entry into the first block 202 to condensation temperature. In the subcooling section 227, the condensed refrigerant 205 is further cooled from its condensation temperature, i.e., subcooled.

In the embodiment of FIG. 3, the subcooling section 227 is, for example, single-flow or odd-numbered flow, so that there is no deflection of the refrigerant to an even-number deflection of the refrigerant 205 in the subcooling section 227.

FIG. 3 shows that optionally between the desuperheating and condensing section 226 and the subcooling section 227, a refrigerant collector 228 is arranged interconnected.

For interconnecting the refrigerant collector 228, the first block 202 comprises a second refrigerant passage channel 229 and a third refrigerant passage channel 230. The second refrigerant passage channel 229 fluidly connects the desuperheating and condensing section 226 to the refrigerant collector 228 and the third refrigerant passage channel 230 fluidly connects the refrigerant collector 228 to the subcooling section 227. The refrigerant 205 therefore flows at the end of the desuperheating and condensing section 226 through the second refrigerant passage channel 229, through the refrigerant collector 228 and then through the third refrigerant passage channel 230 to the subcooling section 227.

The second refrigerant inlet 219 of the second block 210 is in fluid connection via the first refrigerant passage channel 220 with the second refrigerant outlet 221 of the second block 210. The second refrigerant outlet 221 of the second block 210 is in fluid connection with the fourth refrigerant inlet 224 of the expansion valve 216, and the fourth refrigerant outlet 225 of the expansion valve 216 is in fluid connection with the third refrigerant inlet 222 of the second block 210. Thus, the expansion valve 216 is interconnected with the second block 210.

The second block 210 is designed such that the refrigerant 205 flows through the second refrigerant inlet 219 of the second block 210 into the second block 210, the second block 210 is traversable through the first refrigerant passage channel 220 by the refrigerant 205 and the refrigerant 205 flows out via the second refrigerant outlet 221, to the expansion valve 216 with the fourth refrigerant inlet 224, wherein the expansion valve 216 is flowed through by the refrigerant 205 and the refrigerant 205 flows out from the fourth refrigerant outlet 225 of the expansion valve 216 into the third refrigerant inlet 122 of the second block 210. From the third refrigerant inlet 222, the third fluid channels 214 of the second block 210 are flowed through, wherein at the third refrigerant outlet 223, the refrigerant 205 flows out of the second block 210.

According to the embodiment of FIG. 3 shown, a fourth refrigerant passage channel 231 may optionally be provided between the third refrigerant inlet 222 and the third fluid channels 214 of the second block 210.

Optionally, which is also shown in the embodiment of FIG. 3, a fifth refrigerant passage channel 232 may be provided between the third fluid channels 214 of the second block 210 and the third refrigerant outlet 223.

The third refrigerant outlet 223 of the second block 210 is fluidly connected to the sixth refrigerant inlet 272 of the third block 260, wherein the fifth refrigerant inlet 270 of the third block 260 is fluidly connected to the first refrigerant outlet 218 of the first block 202. The fifth refrigerant outlet 271 of the third block 260 is fluidly connected to the second refrigerant inlet 219 of the second block 210. From the sixth refrigerant outlet 273, refrigerant 205 is discharged from the heat exchanger module 201.

The third block 260 is designed such that the refrigerant 205 flows through the fifth refrigerant inlet 270 of the third block 260 into the third block 260, the third block 260 flows through the fifth fluid channels 261 and the refrigerant 205 flows out via the fifth refrigerant outlet 271 of the third block 260, to the second block 210. Furthermore, refrigerant 205 is flowed from the second block 210 from the third refrigerant outlet 223 into the sixth refrigerant inlet 272 of the third block 260. The third block 260 is flowed by refrigerant 205 through the sixth fluid channels 262 and the refrigerant 205 flows out of the third block 260 via the sixth refrigerant outlet 273.

According to an advantageous idea, the first block 202 and/or the second block 210 and/or also additional blocks, such as the third block 260, may be formed in stacked-plate design with a stacking of stacking plates 50, see FIG. 4, wherein in the stacking plates 50 openings 51 for the inflow and outflow of refrigerant 205 and/or liquid coolant are provided and that between adjacent stacking plates 50, first fluid channels 208, second fluid channels 209, third fluid channels 214 and/or fourth fluid channels 215 and optionally also fifth fluid channels 261 and/or sixth fluid channels 262 are formed.

In this case, the stacking plates 50 also serve to ensure that the first refrigerant passage channel 220, the second refrigerant passage channel 229, the third refrigerant passage channel 230 and/or the fourth refrigerant passage channel 231 and/or additional refrigerant passage channels, such as a fifth refrigerant passage channel 232 is or are formed, wherein the stacking plates form openings 52 and the annular regions 53 and/or annular formations 54 surrounding the openings 52, wherein the annular formations 54 and/or the annular regions 53 of adjacent stacking plates 50 are sealed together to form a sealed channel as a refrigerant passage channel 220, 229, 230, 231, 232.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A heat exchanger module comprising:
   a first block of a first heat exchanger, which is formed as a liquid-cooled condenser, the first block having first fluid channels for a refrigerant and having second fluid channels for a first liquid coolant;

a second block of a second heat exchanger, which is formed as a liquid-cooled chiller, the second block having third fluid channels for the refrigerant and fourth fluid channels for a second liquid coolant; and an expansion valve, wherein the first block, the second block, and the expansion valve are formed as an interconnected module, wherein the first block has a first refrigerant inlet and a first refrigerant outlet and the second block has a second refrigerant inlet, a first refrigerant passage channel, a second refrigerant outlet and a third refrigerant inlet and a third refrigerant outlet, wherein the expansion valve has a fourth refrigerant inlet and a fourth refrigerant outlet, and wherein the first refrigerant outlet of the first block is in fluid connection with the second refrigerant inlet of the second block, the second refrigerant inlet of the second block is in fluid connection via the first refrigerant passage channel with the second refrigerant outlet of the second block, the second refrigerant outlet of the second block is in fluid connection with the fourth refrigerant inlet of the expansion valve and the fourth refrigerant outlet of the expansion valve is in fluid connection with the third refrigerant inlet of the second block.

2. The heat exchanger module according to claim 1, wherein the first block is formed such that the refrigerant is flowable via the first refrigerant inlet into the first block, the first fluid channels of the first block are flowable by the refrigerant and the refrigerant is flowable through the first refrigerant outlet from the first block.

3. The heat exchanger module according to claim 1, wherein the first block has a desuperheating and condensing section and a subcooling section, and wherein optionally a refrigerant collector is fluidly interconnected between the desuperheating and condensing section and the subcooling section.

4. The heat exchanger module according to claim 3, wherein the first block has a second refrigerant passage channel and a third refrigerant passage channel, wherein the second refrigerant passage channel fluidly connects the desuperheating and condensing section with the refrigerant collector and the third refrigerant passage channel fluidly connects the refrigerant collector with the subcooling section, such that the refrigerant flows from the desuperheating and condensing section to the refrigerant collector via the second refrigerant passage channel, and the refrigerant flows from the refrigerant collector to the subcooling section via the third refrigerant passage channel.

5. The heat exchanger module according to claim 4, wherein the second block is formed such that the refrigerant is flowable via the second refrigerant inlet of the second block into the second block, the second block is traversable by the refrigerant through the first refrigerant passage channel of the refrigerant and the refrigerant is flowable via the second refrigerant outlet to the expansion valve with the fourth refrigerant inlet, wherein the expansion valve is flowable by the refrigerant and the refrigerant is flowable from the fourth refrigerant outlet of the expansion valve into the third refrigerant inlet of the second block, the third fluid channels of the second block are flowable from the third refrigerant inlet, wherein at the third refrigerant outlet the refrigerant is adapted to flow out from the second block, wherein optionally between the third refrigerant inlet and the third fluid channels of the second block a fourth refrigerant passage channel is provided and/or optionally between the third fluid channels of the second block and the third refrigerant outlet a fifth refrigerant passage channel is provided.

6. The heat exchanger module according to claim 1, wherein between the first block and the second block, a third block of a third heat exchanger is interconnected, which is formed as an internal heat exchanger, wherein the third block has fifth fluid channels for the refrigerant and sixth fluid channels for the refrigerant.

7. The heat exchanger module according to claim 6, wherein the third block has a fifth refrigerant inlet and a fifth refrigerant outlet, which communicate with the fifth fluid channels, and wherein the third block has a sixth refrigerant inlet and a sixth refrigerant outlet, which communicate with the sixth fluid channels.

8. The heat exchanger module according to claim 7, wherein the first refrigerant outlet of the first block is in fluid connection with the second refrigerant inlet of the second block via the fifth refrigerant inlet, the fifth fluid channels and the fifth refrigerant outlet of the third block, and wherein the second block is interconnected such that at the third refrigerant outlet of the second block, the refrigerant is adapted to flow out from the second block and flow into the third block via the sixth refrigerant inlet, and the refrigerant is adapted to flow through the sixth fluid channels of the third block and flow out of the third block via the sixth refrigerant outlet of the third block.

9. The heat exchanger module according to claim 6, wherein the first block, the second block and/or the third block are formed in stacked-plate design with a stacking of stacking plates, wherein in the stacking plates openings for the inflow and outflow of the refrigerant and/or liquid coolant are provided, and wherein between adjacent stacking plates, the first fluid channels, the second fluid channels, the third fluid channels, the fourth fluid channels, the fifth fluid channels and/or the sixth fluid channels are formed.

10. The heat exchanger module according to claim 5, wherein the first refrigerant passage channel, the second refrigerant passage channel, the third refrigerant passage channel, the fourth refrigerant passage channel and the fifth refrigerant passage channel are each formed by stacking of stacking plates, wherein the stacking plates have openings and annular formations surrounding the openings, wherein the annular formations of adjacent stacking plates are connected sealed together to form a sealed channel as a refrigerant passage channel.

\* \* \* \* \*